US012591514B2

(12) United States Patent
Blagodurov et al.

(10) Patent No.: US 12,591,514 B2
(45) Date of Patent: Mar. 31, 2026

(54) TRAFFIC AWARE SMART CACHING IN FABRIC SWITCHES

(71) Applicant: Advanced Micro Devices, Inc., Santa Clara, CA (US)

(72) Inventors: Sergey Blagodurov, Bellevue, WA (US); Vamsee Reddy Kommareddy, Austin, TX (US); Pratik Mishra, Santa Clara, CA (US); Nathaniel Morris, Austin, TX (US); Kevin Y. Cheng, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 95 days.

(21) Appl. No.: 18/399,656

(22) Filed: Dec. 28, 2023

(65) Prior Publication Data

US 2025/0217287 A1      Jul. 3, 2025

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC ............. G06F 12/0802; G06F 2212/60; G06F 2212/502; G06F 2212/601
See application file for complete search history.

(56) References Cited

U.S. PATENT DOCUMENTS

| | | | | |
|---|---|---|---|---|
| 2018/0075069 A1* | 3/2018 | Guim Bernat | ...... | G06F 12/0875 |
| 2018/0191642 A1* | 7/2018 | Biederman | ......... | H04L 47/6275 |
| 2022/0318144 A1* | 10/2022 | Bajic | .................. | G06F 12/0646 |
| 2023/0185478 A1* | 6/2023 | Kommareddy | ....... | G06F 9/5016 |
| | | | | 711/118 |
| 2024/0069802 A1* | 2/2024 | Brewer | .................. | G06F 3/067 |
| 2024/0273021 A1* | 8/2024 | Abdelsalam | ........ | G06F 12/0804 |
| 2024/0378161 A1* | 11/2024 | Kwon | ................. | G06F 13/4022 |

FOREIGN PATENT DOCUMENTS

| | | | | | |
|---|---|---|---|---|---|
| WO | WO-2025090058 A1 * | 5/2025 | ......... | G06F 12/0862 |

* cited by examiner

*Primary Examiner* — Michael Krofcheck
(74) *Attorney, Agent, or Firm* — Greenberg Traurig, LLP

(57)      ABSTRACT

An example device can include at least one network controller configured to receive a data request and to retrieve data based on the data request, and a cache agent configured to receive a data access parameter based on the data request, and reconfigure a cache for at least one memory cache based on the data access parameter. The data request can be received from a computer device and the data can be retrieved from at least one memory device. An example data access parameter can include a latency of at least one network-attached memory device to retrieve data from the at least one memory device based on the data request. An example device can further comprises a flit profiler configured to determine the data access parameter. Various other methods, systems, and computer-readable media are also disclosed.

20 Claims, 7 Drawing Sheets

200

Processor
210A

• • •

Processor
210N

Fabric Interface
240

Network Controller
230

Crossbar Switch
232

Cache Controller
234

Cache
235

Profiler Circuit
236

Pattern Circuit
238

Fabric Attached Memory
220

Memory
222A

• • •

Memory
222M

500

Start

Receive data requests from a computing device
502

Retrieve data from memory device
based on data requests
504

Determine network statistics
506

Determine cache policy based on network statistics
508

Cache data based on cache policy
510

End

600

Start

Identify memory latency problem
602

Compare a sparsity ratio to a threshold sparsity
ratio value
604

If sparsity ratio is less than threshold value, allocate
dedicated region of the switch cache to requested
data
606

End

700

TRAFFIC AWARE SMART CACHING IN FABRIC SWITCHES

BACKGROUND

Many traditional computing systems include at least one computer device and at least one memory device interconnected by a network, such as a fabric network. In this context, the term "fabric network" can describe a scalable network topography. It can be advantageous to reconfigure networks and/or memory devices to improve system performance.

SUMMARY

As will be described in greater detail below, the present disclosure describes various apparatus and methods for smart caching within a communications network. In some examples, a system can include a processor and a network controller enabling communication with network switches and network-attached memory devices. An example system can further include a network manager configured to communicate with the network and to configure the use of memory devices attached to or otherwise in communication with network switches. The network manager can be configured to receive data from one or more computer devices and one or more network-attached memory devices and/or other memory devices.

In some examples, a device can include a cache configured to cache data requests for a fabric-attached memory device and, a cache controller configured to reconfigure a cache policy of the cache based on a data access parameter corresponding to the fabric-attached memory device. In some examples, the device can include at least one network controller that is configured to receive a data request from a computing device and retrieve requested data from at least one memory device. In some examples, the data access parameter comprises a latency of the fabric-attached memory device to retrieve data based on a data request.

In some examples, the device further includes a flit profiler circuit configured to determine the data access parameter. In some examples, the device further includes a pattern statistics analyzer circuit, wherein the pattern statistics analyzer circuit is configured to provide data access statistics based on the data access parameter. In some examples, the flit profiler circuit is further configured to provide a data packet including the data access parameter to the pattern statistics analyzer circuit.

In some examples, the device can further include a first network controller circuit configured to receive a data request, a second network controller circuit configured to retrieve data based on the data request, and a third network controller circuit configured to retrieve second data from at least a second memory device. In some examples, the data access parameter comprises a data sparsity ratio determined as a number of accessed memory pages on a memory device as a percentage of a total number of pages allocated on the memory device.

In some examples, the device comprises a network switch. In some examples, the fabric-attached memory device comprises at least one network-attached memory device. In some examples, the network switch comprises a crossbar switch. In some examples, the crossbar switch comprises the cache controller.

In some examples, a system includes at least one network controller configured to receive a data request and to retrieve requested data from a network-attached memory device based on the data request, a pattern statistics analyzer circuit configured to provide a data access parameter based at least in part on the data request, a cache configured to cache data requests for the network-attached memory device, and a cache controller configured to reconfigure a cache policy of the cache based on the data access parameter.

In some examples, the data access parameter includes a data sparsity ratio determined as a number of accessed memory pages on a particular memory device as a percentage of a total number of pages allocated on the particular memory device. In some examples, the cache controller is configured to modify the cache policy based on the data sparsity ratio. In some examples, the cache controller is configured to modify the cache policy to cache requested data if the data sparsity ratio is less than a threshold data sparsity ratio.

In some examples, the system comprises a network switch. In some examples, the network-attached memory device corresponds to a fabric-attached memory device.

In some examples, a method includes receiving, by a network switch, data requests from a computing device, determining data statistics based on the data requests, determining a cache policy for a cache of the network switch based on data statistics, and caching data in the cache based on the cache policy to reduce data latency for data requested by the computing device. In some examples, the data statistics include a data sparsity ratio determined as a number of accessed memory pages on a memory device as a percentage of a total number of pages allocated on the memory device. In some examples, the memory device is a fabric-attached memory device.

In some examples, wherein the method is at least partially performed by the network switch. In some examples, the network switch is a component of a fabric network. In some examples, caching data comprises caching data for a fabric-attached memory device of the fabric network. In some examples, the method is performed for each of a plurality of fabric-attached memory devices.

In some examples, a device can include at least one network controller configured to receive a data request and to retrieve data based on the data request, and a cache agent configured to receive a data access parameter based on the data request, and reconfigure a connection to at least one memory cache based on the data access parameter. The at least one network controller can be configured to receive the data request from a computer device, and retrieve the data from at least one memory device.

In some examples, a device can include a flit profiler configured to determine the data access parameter. In some examples, a device can comprise a pattern statistics analyzer configured to provide data access statistics, for example, based on and/or including data access parameter. The flit profiler can be configured to provide a data packet including the data access parameter to the pattern statistics analyzer. In some examples, the data access parameter can include a latency of at least one network-attached memory device to retrieve data based on the data request.

In some examples, the at least one network controller can include a first network controller circuit configured to receive a data request, a second network controller circuit configured to and to retrieve data based on the data request, and optionally a third network controller circuit configured to retrieve second data from at least a second memory device. In some examples, the data access parameter can include a data sparsity ratio determined as a number of accessed memory pages on a memory device as a percentage of a total number of pages allocated on the memory device.

In some examples, the device can include a network switch, and the at least one memory cache comprises at least one network-attached memory device. The network switch can include a crossbar connection, and the crossbar connection comprises the cache agent.

In some examples, a system can include at least one network controller configured to receive a data request and to retrieve requested data based on the data request, a pattern statistics analyzer configured to provide a data access parameter based at least in part on the data request, and a cache agent configured to reconfigure a connection to at least one memory cache based on the data access parameter. The data access parameter can include a data sparsity ratio determined as a number of accessed memory pages on a particular memory device as a percentage of a total number of pages allocated on the particular memory device. The cache agent can be configured to modify the at least one memory cache based on the data sparsity ratio and/or can be configured to modify the at least one cache memory to cache requested data. If the data sparsity ratio is less than a threshold data sparsity ratio. In some examples, the system can include a network switch and the at least one memory cache can include at least one network-attached memory device.

In some examples, a method includes receiving (e.g., by a network switch) data requests from a computer device, determining data statistics (e.g., data access parameters) based on the data requests, determining a cache policy based on the data statistics, and caching data based on the cache policy to reduce data latency for data requested by the computer device. The data statistics can include a data sparsity ratio, for example, determined as a number of accessed memory pages on a particular memory device as a percentage of the total number of pages allocated on the particular memory device. In some examples, the memory device can be a fabric-attached memory device. The method can be at least partially performed by the network switch. In some examples, the method can be a computer-implemented method for traffic aware smart caching in a network switch. At least a portion of the method can be performed by a computer device including at least one processor. The network switch can a component of a fabric network, and caching data can include caching data on a fabric-attached memory device.

Features from any of the implementations described herein can be used in combination with one another in accordance with the general principles described herein. These and other implementations, features, and advantages will be more fully understood upon reading the following detailed description in conjunction with the accompanying drawings and claims.

BRIEF DESCRIPTION OF THE DRAWINGS

The accompanying drawings illustrate a number of example implementations and are a part of the specification. Together with the following description, these drawings demonstrate and explain various principles of the present disclosure.

Figure 1:
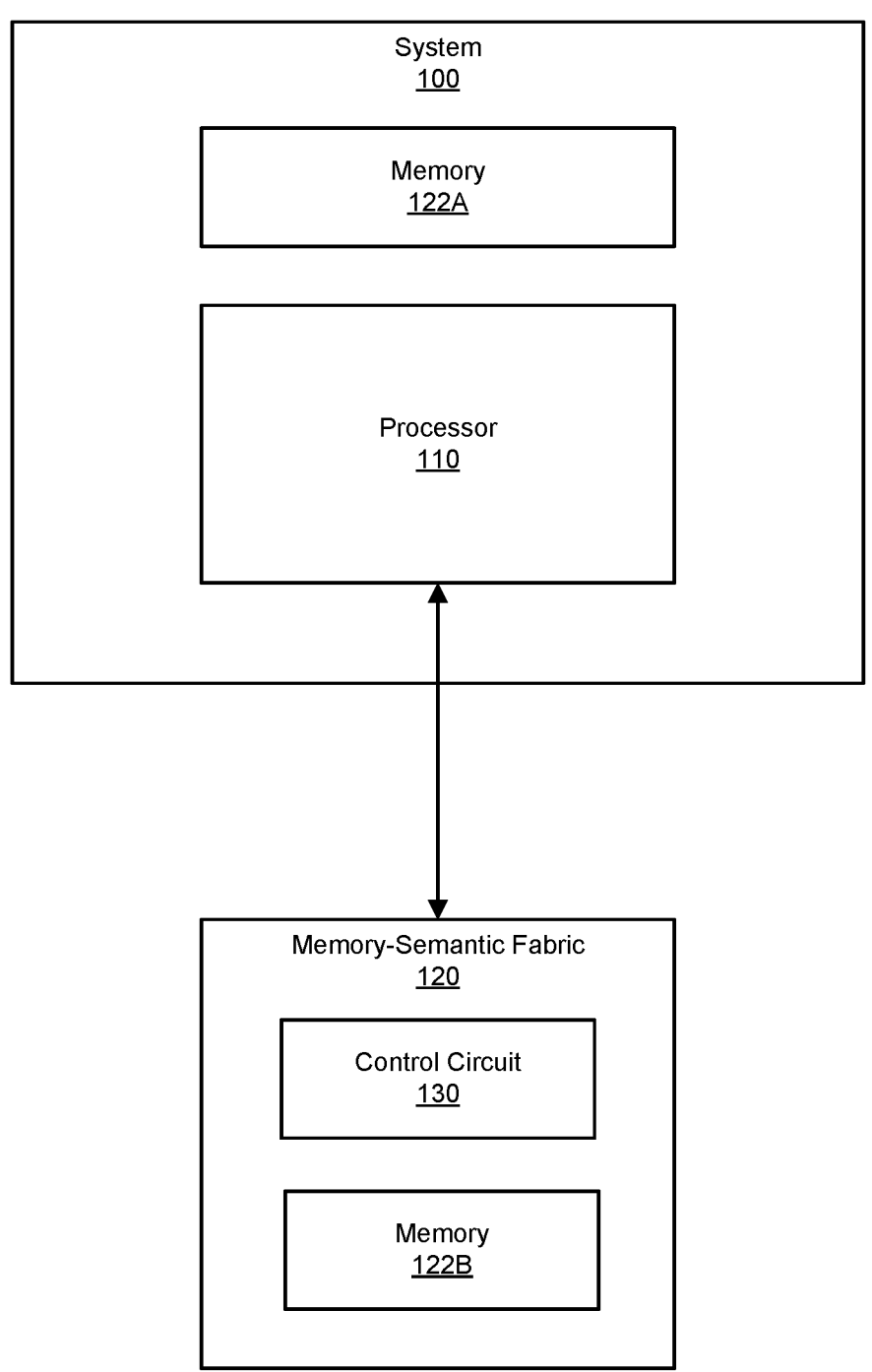
FIG. 1 is a block diagram of an example system that can be a component of a system including traffic aware smart caching, according to some examples.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for traffic aware smart caching in switch arrangements, such as fabric switches. The following will provide, with reference to FIGS. 1-7, detailed descriptions of example systems and corresponding computer-implemented methods for traffic aware smart caching in switch arrangements.

Fabric standards (of which there are several) exemplify approaches to data center disaggregation, in which one or more CPU or GPU hosts can access fabric-attached memory (FAM) devices. In some examples, memory devices can be directly attached to the data center fabric, with no or few compute capabilities associated with the memory devices. With FAM, hosts (e.g., computer devices) are not constrained by the memory capacity limitations of local servers. In some example, hosts can gain access to vast pools of memory that need not be associated with any particular host. Hosts can coordinate to partition memory devices among themselves, for example, to share one or more FAM devices. Examples can include the use of any suitable fabric standard.

In some examples, a topology-aware memory caching scheme can use network devices to improve the performance of the workloads running on FAM. Example approaches can benefit from the centralized position of networking devices in the topology. An example system can manage the caching across multiple FAM components. A cache device can be attached to (e.g., in communication with) a network switch (e.g., a leaf switch such as a leaf CXL switch). The network switch can be connected to one or more FAM devices, for example, allowing pooled memory use of the FAM devices.

A switch-resident cache agent, which can be referred to as a smart cache agent, can allow smart memory caching via predictive time-series analysis, can automatically allow reduced effective latency of host access, and can alleviate the differences in the memory load observed across attached memory devices based on FAM component loads and the workload access pattern.

Disaggregated system architectures, in which resources are decoupled, allow training of distributed AI models and process cloud workloads efficiently. Fabric topologies can include CXL, xGMI, NVlink, or any other suitable fabric configuration. Example fabric configurations include high performance, low latency, memory-centric fabrics that can be used to communicate to every device in the system and enable communication between various resources.

In large-scale distributed disaggregated systems, network congestion can severely affect performance scalability. Reducing network congestion can improve access latency and system performance while reducing energy consumption. Traffic aware caching associated with networking hardware (e.g., network switches) can improve the performance of various distributed systems.

Memory-intensive applications such as graph analytics, machine learning, in-memory databases, and memory caching systems have large memory requirements, and benefit from a fabric-attached memory topology which enables hosts (e.g., computer devices attached to the network) to have access to large memory pools and to scale the memory capacity based on workloads.

However, efficient use of the available FAM resources is challenging. If data from the host is stored arbitrarily, certain FAM nodes can become overloaded if, for example, a small subset of the FAM nodes are used to store most of the frequently accessed data. This results in application performance degradation due to higher memory access latencies at these FAM components. It also results in lower bandwidth utilization of the remaining FAM components. If multiple hosts share the same FAM component, the component can become overloaded from the aggregate of access requests across the multiple hosts. In some examples, overloaded FAM components are identified when making new data placement decisions, allowing further application performance improvements.

Examples include a cache agent associated with (e.g., located in) at least one network switch (e.g., at least one fabric switch). The cache agent can alleviate the congestion concerns by placing the cached copies of data locally in the switch buffers or other memory device proximate the switch, to prevent memory configurations and data access patterns from degrading application performance. Examples include systems and methods for both caching of load/store memory requests and coherency tracking inside a probe filter.

In some examples, caching can be done on compute nodes themselves, but this approach is inherently inflexible. However, examples can include caching on compute notes in addition to caching associated with network devices, such as caching on memories (including cache buffers) associated with one or more fabric switches.

FIG. 1 is a block diagram of an example system 100 for prioritizing memory traffic of a memory-semantic fabric for multi-process workloads. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 122A. Memory 122A generally represents any type or form of volatile or non-volatile storage/memory device or medium capable of storing data and/or computer-readable instructions. Examples of memory 122A include, without limitation, Random Access Memory (RAM), Read Only Memory (ROM), flash memory, Hard Disk Drives (HDDs), Solid- State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory-semantic fabric 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, system 100 (e.g., processor 110) is coupled to a memory-semantic fabric 120. A memory-semantic fabric (e.g., an example fabric network), in some examples, refers to one or more memory devices connected to a fabric as an interface to allow access to various devices (e.g., processors and other components). The fabric allows access to memory devices that can be distributed across various physical interfaces, including networked devices, such that the memory devices can be flexibly allocated as resources. For example, memory-semantic fabric 120 includes a memory 122B that can correspond to a memory device similar to memory 122A. Memory-semantic fabric 120 further includes a control circuit 130 that corresponds to a circuit for managing memory-semantic fabric 120 (e.g., access to memory 122B). In some examples, system 100 can be connected to memory-semantic fabric 120 through a network that generally represents any medium or architecture capable of facilitation communication or data transfer (e.g., through wireless and/or wired connections). Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network. In some examples, memory 122B can correspond to a network-attached memory device (e.g., a memory device connected to a processor through a network) and can further correspond to a fabric-attached memory device (e.g., a memory device connected to a processor through a memory-semantic fabric).

Figure 2:
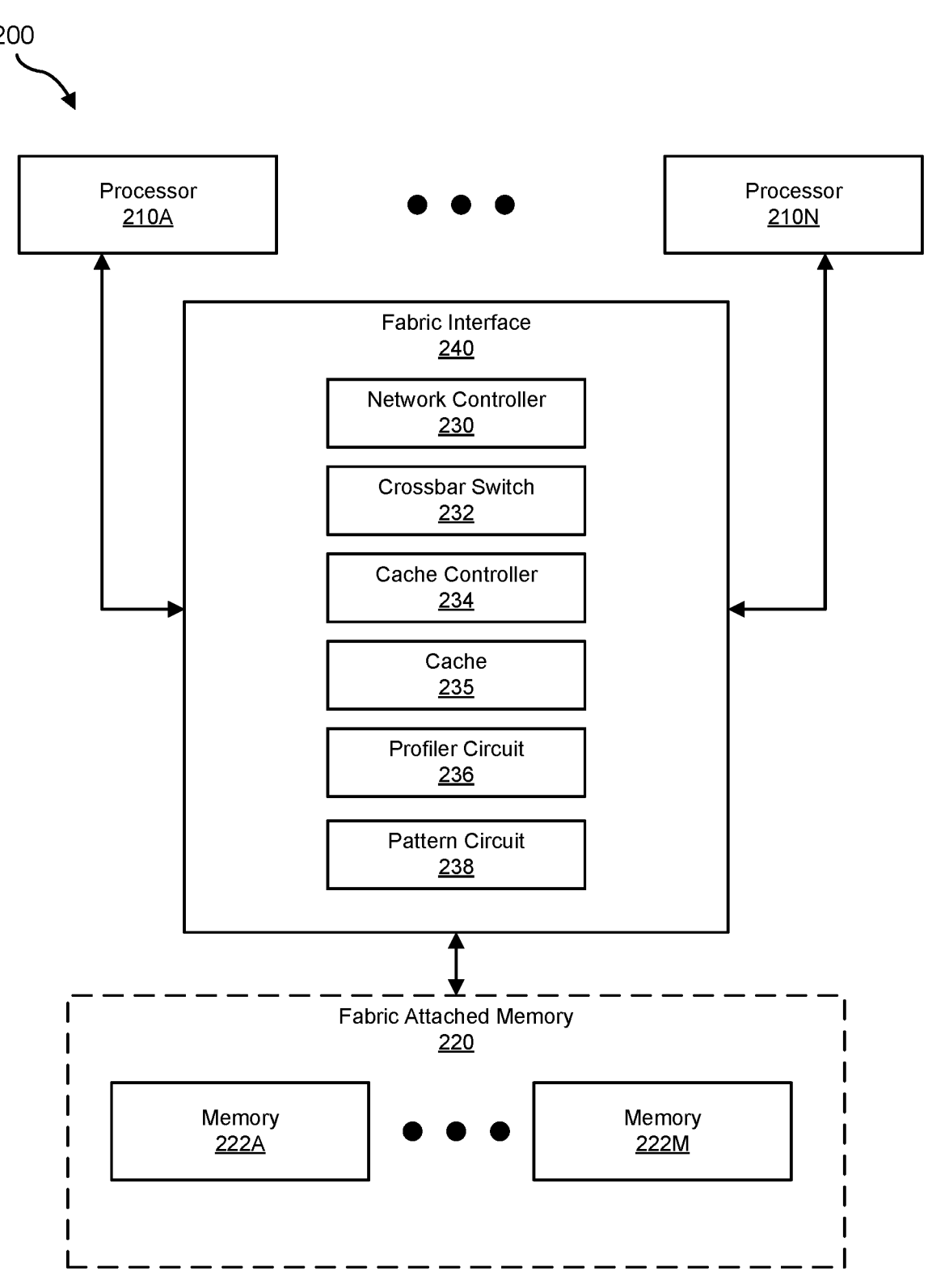
FIG. 2 is a block diagram of an example system that can include traffic aware smart caching, according to some examples.

FIG. 2 illustrates a system 200, that corresponds to system 100, having a memory-semantic fabric. System 200 includes multiple processors such as a processor 210A, corresponding to an iteration of processor 110 and a processor 210N corresponding to another iteration of processor 110. System 200 also includes a fabric-attached memory (FAM) 220 that corresponds to memory-semantic fabric 120. FAM 220 includes multiple memory devices such as a memory 222A, corresponding to an iteration of memory 122B and a memory 222M corresponding to another iteration of memory 122B. System 200 further includes a fabric interface 240, corresponding to circuitry and/or components for connecting and/or managing memory devices (e.g., network-attached memory devices such as memory 222A-222M). In some implementations, fabric interface 240 corresponds to networking hardware, such as a network switch (e.g., a networking device for connecting devices on a network by forwarding data), a network interface card (NIC), etc.

As illustrated in FIG. 2, processors 210A-210N can access FAM 220 (e.g., memory 222A-222M) via fabric interface 240. Thus, even if memory 222A-222M are remote from processors 210A-210N (e.g., off socket, in another device as connected through a network, etc.), processors 210A-210N can access memory 222A-222M. Fabric interface 240 can include one or more control circuits (e.g., one or more instances of control circuit 130) for managing access to memory 222A-222M to prevent a single processor/ application from monopolizing a particular memory resource. For example, in FIG. 2, fabric interface 240 can include a network controller 230 (e.g., a controller, control circuit and/or other circuit with instructions for managing network traffic in accordance with a network protocol, which in some implementations can correspond to an iteration of control circuit 130), a crossbar switch 232 (e.g., a circuit having multiple inputs and multiple outputs for directing data signals), a cache controller 234 (e.g., a controller, control circuit, and/or other circuit with instructions/logic for managing a cache corresponding to distributed memory, and which in some implementations can correspond to an iteration of control circuit 130), a cache 235 (e.g., a cache structure/hierarchy and/or buffer such as a memory device for holding data which in some implementations correspond to data requests for fabric attached memory devices), a profiler circuit 236 (e.g., a circuit having instructions/logic for tracking/processing network traffic-related metric, which in some implementations can correspond to an iteration of control circuit 130), and a pattern circuit 238 (e.g., a circuit having instructions/logic for statistical analysis, which in some implementations can correspond to an iteration of control circuit 130). Although not expressly illustrated in FIG. 2, network controller 230, crossbar switch 232, cache controller 234, cache 235, profiler circuit 236, and/or pattern circuit 238 can interface and/or otherwise be integrated in any combination, as will be described further below.

Many other devices or subsystems can be connected to or included within system 100 in FIG. 1 and/or system 200 in FIG. 2. Conversely, all of the components and devices illustrated in FIGS. 1 and 2 need not be present to practice the implementations described and/or illustrated herein. The devices and subsystems referenced above can also be inter-connected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applica-tions, computer-readable instructions, and/or computer con-trol logic) on a computer-readable medium.

The term "computer-readable medium," as used herein, generally refers to any form of device, carrier, or medium capable of storing or carrying computer-readable instruc-tions. Examples of computer-readable media include, with-out limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), elec-tronic-storage media (e.g., solid-state drives and flash media), and other distribution systems.

Figure 3:
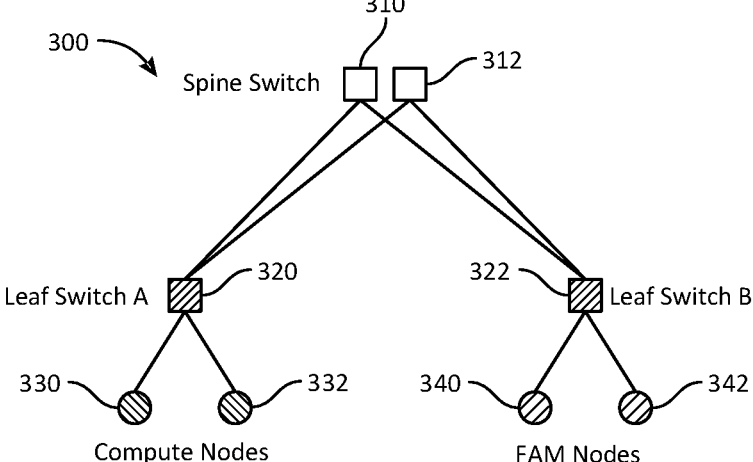
FIG. 3 is a block diagram of an example system including compute nodes, fabric-attached memory (FAM) nodes, and an arrangement of network switches, according to some examples.

FIG. 3 is a block diagram of an example system 300 including spine switches 310 and 312, leaf switch A (320)

connected to compute nodes 330 and 332 (e.g., where each compute node can correspond to at least one computer device such as system 100 and further corresponding to processors 210A-210N), and leaf switch B (322) connected to FAM nodes 340 and 342 (e.g., where each FAM node can correspond to the location of at least one FAM device such as memory 222A-222M). As illustrated, example system 300 includes a network of switches connecting the compute nodes to the FAM nodes. In some examples, one or more switches can be associated with an addition memory device, as described in more detail below. A relatively simple example system is shown for illustrative convenience, and the example system 300 can include additional compute nodes, FAM nodes, and/or network switches.

In some examples, a system architecture includes a host (e.g., including at least one processor such as a CPU, for example processor 110 and/or processors 210A-210N) that is connected to the front end of a switch device via any suitable network protocol (e.g., a fabric protocol such as CXL, NVLink, xGMI or Slingshot). The egress ports of the switch can be connected to a composable pool of FAM (fabric-attached memory) devices (e.g., memory 222A-222M). Features of the architecture can include memory capacity expandability. In some examples, a cache agent can reside within the switch ASIC's crossbar on the path used by particular hosts accessing their allocated FAM regions. An example architecture is discussed in more detail below in relation to FIG. 4.

Figure 4:
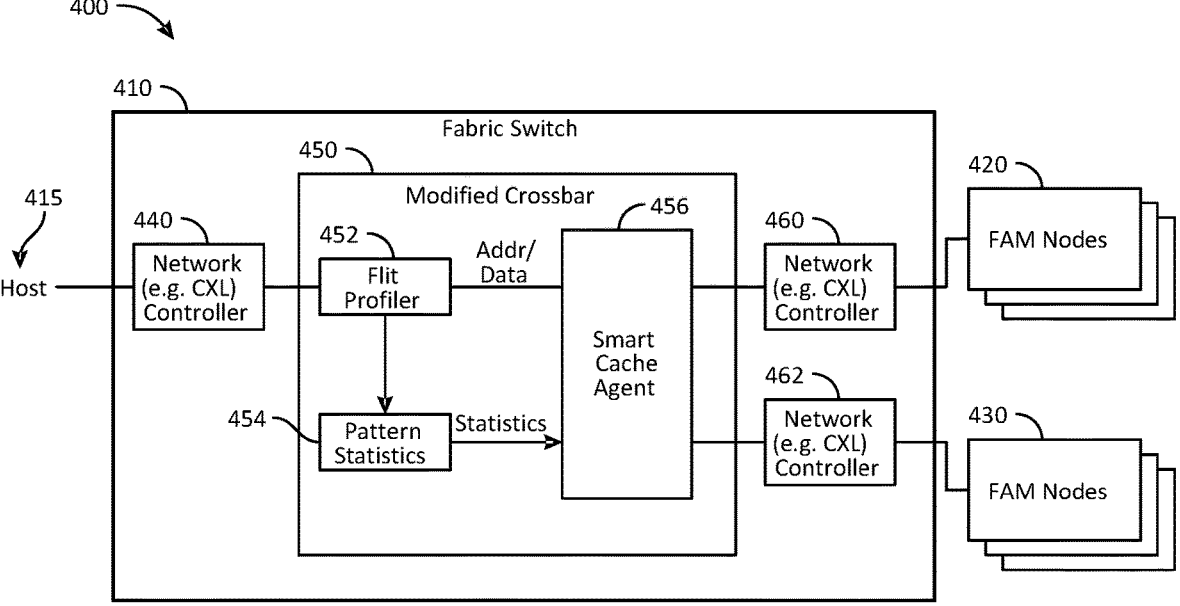
FIG. 4 is a schematic of an arrangement of network switch including a cache agent, according to some examples.

FIG. 4 is a schematic of an example network switch 410 (e.g., a fabric switch corresponding to fabric interface 240) within a network portion 400 that can be used within a system, such as the system shown in FIGS. 1, 2, and/or 3. The network switch 410 is connected to a host, such as a compute node as discussed above in relation to FIG. 3. The network switch 410 is also connectable to one or more FAM nodes 420 and/or second FAM nodes 430 (e.g., correspond-ing to memory 222A-222M). The network switch includes a first network controller 440 (corresponding to an instance of network controller 230), a second network controller 460 (corresponding to a separate instance of network controller 230), a third network controller 462 (corresponding to a separate instance of network controller 230), and a modified crossbar 450 (corresponding to crossbar switch 232) includ-ing a flit profiler 452 (e.g., a flit profiler circuit correspond-ing to profiler circuit 236), pattern statistics analyzer 454 (e.g., a pattern statistics analyzer circuit corresponding to pattern circuit 238), and cache agent 456 (which can also be referred to as a cache agent circuit, e.g., a smart cache agent, corresponding to cache controller 234) for controlling a cache policy for a cache (e.g., corresponding to cache 235) of network switch 410. In some examples, the cache can be part of modified crossbar 450 (e.g., integrated with and/or otherwise interfacing with cache agent 456) and/or can be connected elsewhere within network switch 410. The first network controller 440 can receive requests from a host (e.g., host 415) and transmit data to the host 415. The second network controller 460 is in communication with FAM nodes 420 and the third network controller 462 is in com-munication with second FAM nodes 430. In some examples, FAM nodes (such as FAM nodes 420 and/or second FAM nodes 430) can include FAM nodes proximate the network switch and/or local memory (e.g., a buffer) within the network switch.

In some examples, a modified crossbar 450 of the network switch 410 (e.g., a fabric switch) can include a flit profiler 452. The flit profiler 452 can receive memory requests from one or more host controllers, such as from host 415. The flit profiler 452 can deserialize the fabric flits, profile the data access patterns as a data access summary included in a data packet and forward the data packet to the cache agent 456. The data access summaries can also be sent to the pattern statistics analyzer 454, which can collect metrics of interest such as read/write access patterns and provide network statistics. The flit profiler 452 can also tracks the bandwidth utilization at each FAM node and request latencies experienced at the node. The cache agent 456 receives the data summaries as well as data statistics and applies a caching policy on the incoming requests.

The data statistics can be gathered per time interval (T) which can be a configurable parameter of the switch device. This parameter can be provided to the host as a memory mapped register and can be a time interval between 30 seconds and 5 minutes, for example, 1 minute.

Collected data statistics include one or more of the following data access parameters. A data parameter can include the total number of FAM loads/stores (e.g., memory requests) over the time interval for each device. A further data parameter can include the 99th percentile (or other percentile value) of request queueing delay in the switch egress port of each FAM device, or other measurement of latency. A further data parameter can include the data sparsity ratio, which can be determined as the number of accessed memory pages as a percentage of the total number of pages allocated on each FAM device. A page in memory can include, for example, 4 kB of data, or other size.

In some examples, a pooling memory approach can be supported by one or more versions of CXL or other protocol. In some examples, a single requestor (e.g., a multi-CPU node) can access the FAM region. In some examples, multiple hosts can map the same FAM device but the FAM ranges they can map can be non-overlapping. Non-overlapping FAM ranges allows coherency requests are not sent on the fabric and the lines cached on the CXL switch need only to be flushed upon the FAM range being unmapped or reassigned to another host.

In some examples, a system architecture includes a host (e.g., including at least one processor such as a CPU, corresponding to host 415) that is connected to the front end of a switch device (e.g., network switch 410) via a network protocol (e.g., a fabric protocol such as CXL, NVLink, xGMI or Slingshot). The egress ports of the switch can be connected to a composable pool of FAM (fabric-attached memory) devices (e.g., FAM nodes 420 and/or FAM nodes 430). Features of the architecture can include memory capacity expandability. In some examples, a system can include an intelligent cache agent (e.g., cache agent 456) that can reside within the switch ASIC's crossbar (e.g., modified crossbar 450) on the critical path for hosts accessing their FAM regions.

Examples include converged, hybrid IT and the Software Defined Data Center (SDDC) installations. A fabric manager (e.g., control circuit 130) can perform component discovery, configuration, partitioning and isolation. In some examples, the fabric manager can find the inventory of all components that can be composed into new things (e.g., resource blocks such as at least one of one or more of the following: a processor, a memory device (e.g., including a dual in-line memory module (DIMM)), an SCM (server configuration manager), a drive or a switch cache. An example fabric manager can also determine, transmit, and/or store descriptors containing the binding restrictions of the different components (e.g., resource zones) and annotations informing the client as to how to form composition requests (collection capabilities). The fabric manager can allocates each slice of the FAM responder component to a subset of compute requestors (e.g., using a get request to the schema), and can be notified when FAM responder is unmapped from the given compute requestor (e.g., using patch or put requests).

Examples can further include functionality provided by the fabric manager, for example, to flush the switch cache when a slice of the FAM responder is unmapped from all its compute requestors (e.g., using patch or put requests). This can be achieved using a configuration register exposed by the switch to the fabric manager, for example, accessible via an address (e.g., a CXL.io address in some configurations).

Using determined or received metrics, the cache agent (e.g., cache controller 234 and/or cache agent 456) can then determine how to repartition the cache buffer (e.g., cache 235) among the requests of each FAM device (e.g. memory 222A-222M and/or FAM nodes 420 and 430). An example method is as follows. Every time interval, the cache agent can first checks if the 99th percentile of the queueing delay exceeds a configurable threshold (e.g., 100 ns or other appropriate value) for each FAM device. If exceeded, the sparsity ratio can then be checked. If the sparsity ratio is less than 10% then the FAM device is accessed with some locality. If so, a dedicated region of the switch cache (e.g., cache 235) equal to the percentage of the accesses going to the particular FAM device is carved out and is used exclusively to cache the requests to this device with, for example, a least recently used (LRU) eviction policy. These steps can be repeated for every FAM device attached to the switch (e.g., fabric interface 240 and/or network switch 410). Afterwards, if some area is left in the cache buffer unassigned, it can be used to cache requests of all FAM devices, for example, using an LRU eviction policy.

Figure 5:
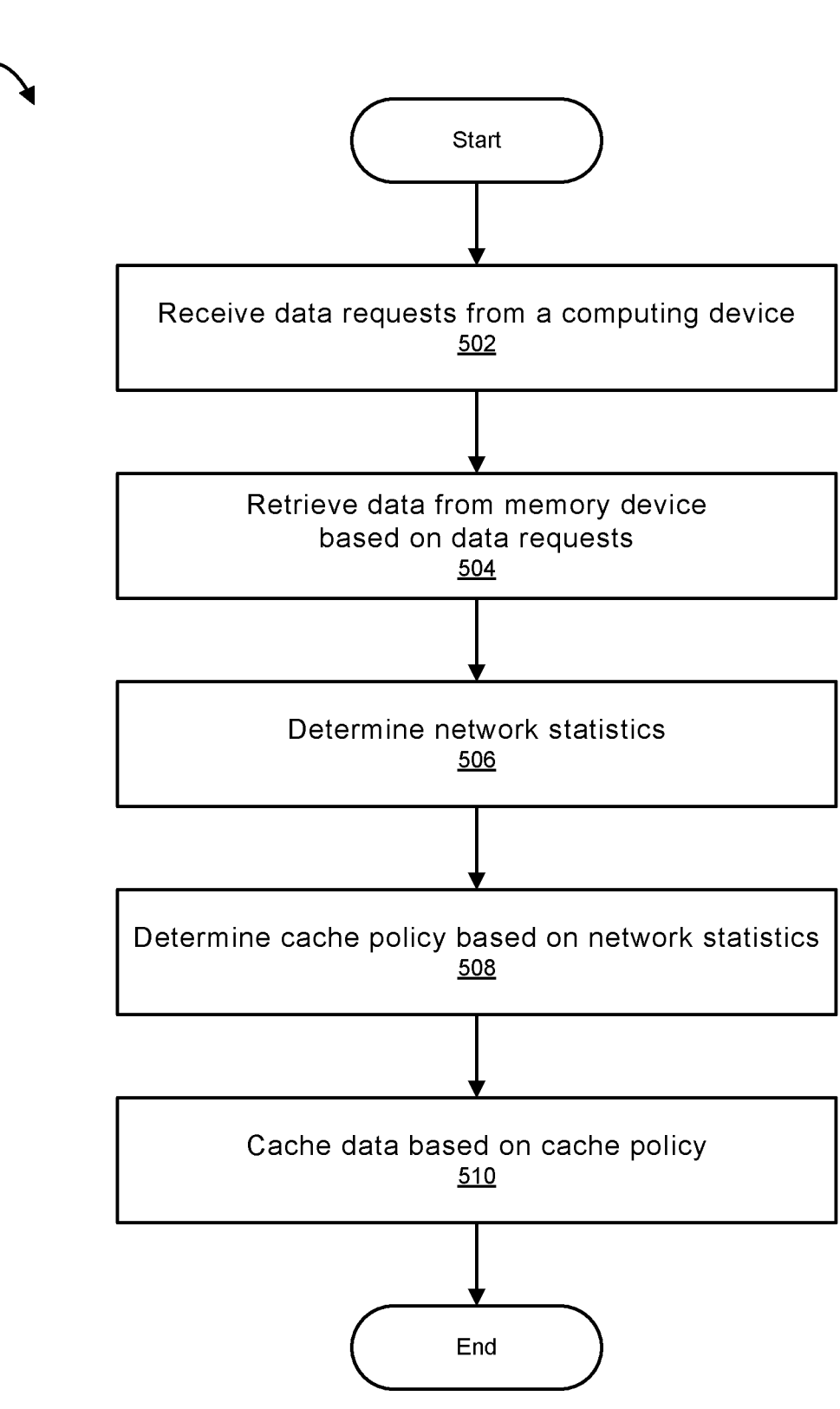
FIG. 5 shows a process for traffic aware smart caching in switch arrangements, according to some examples.
Figure 6:
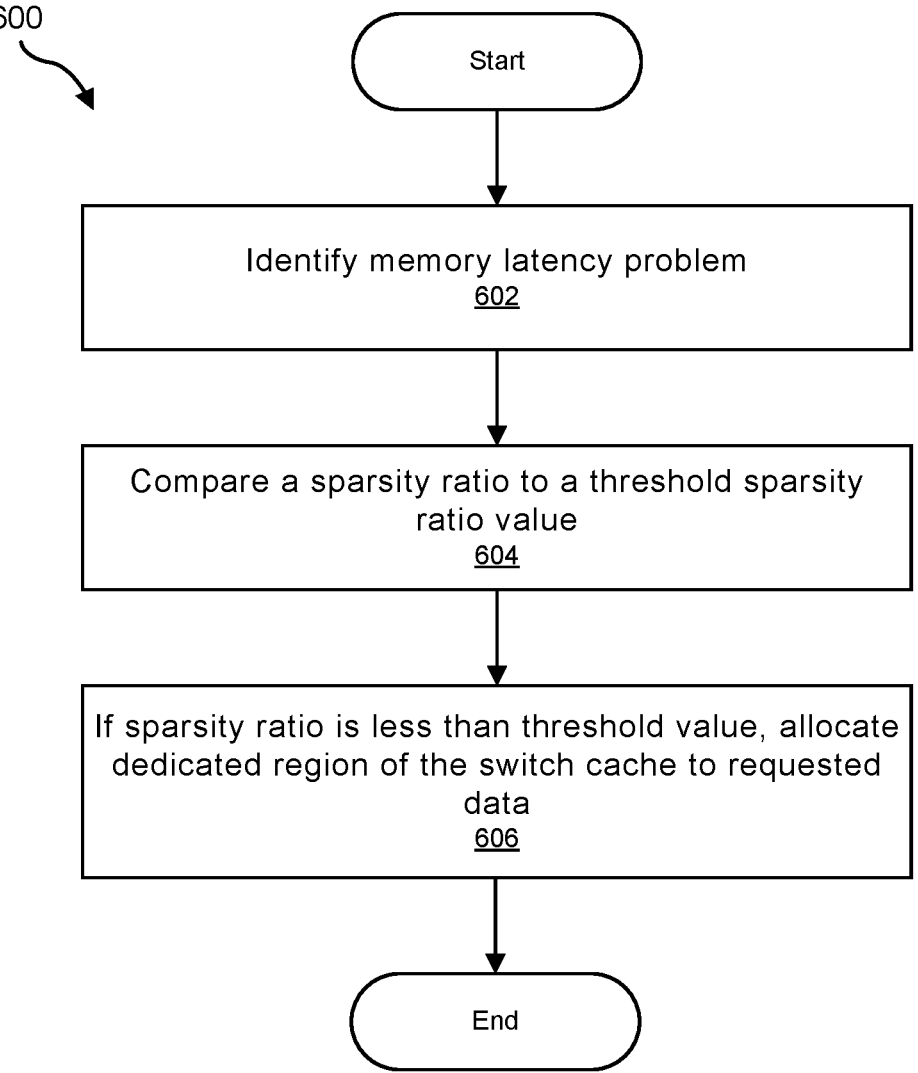
FIG. 6 shows a further process for traffic aware smart caching in switch arrangements, according to some examples.
Figure 7:
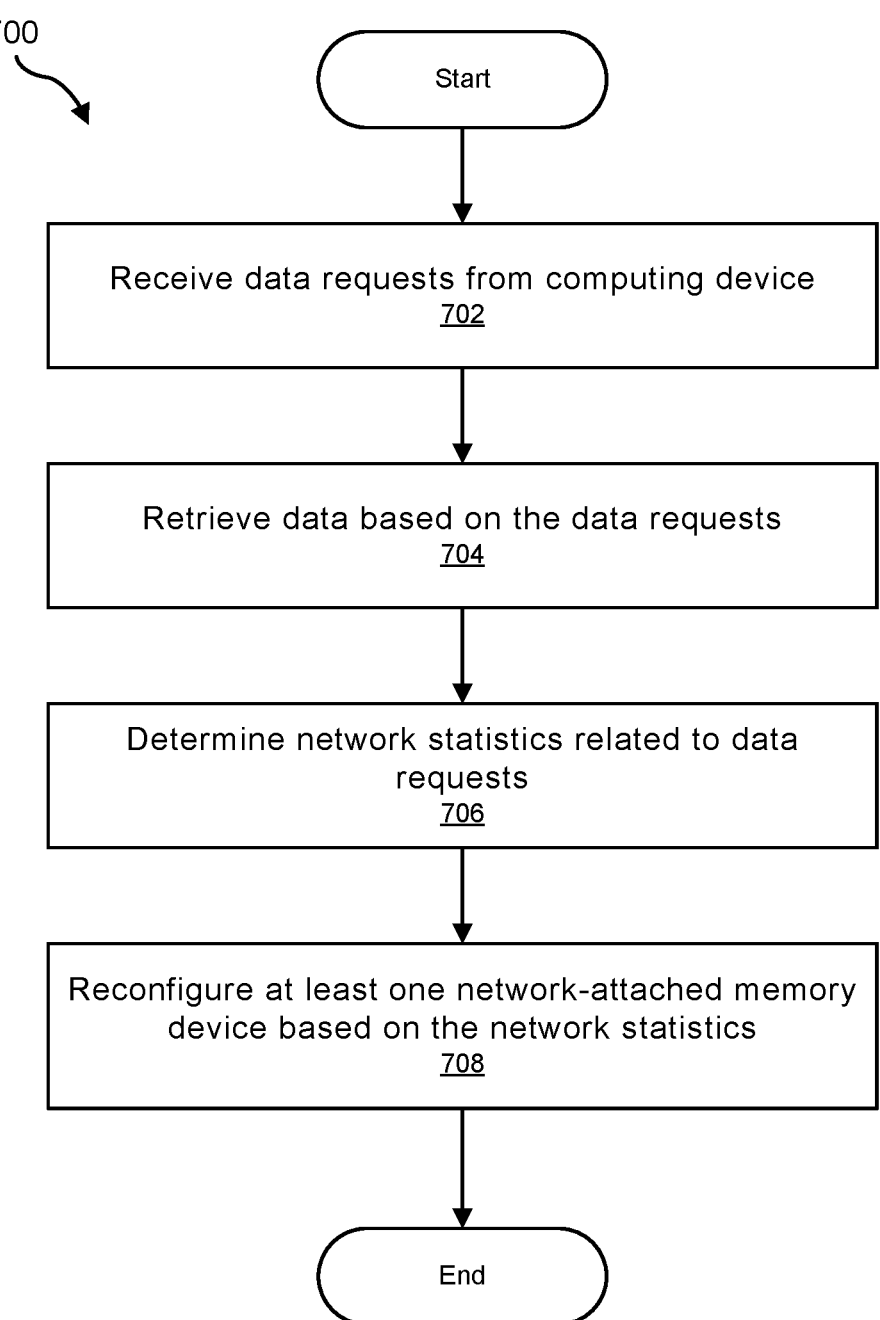
FIG. 7 shows a further process for traffic aware smart caching in switch arrangements, according to some examples7

FIGS. 5-7 show flow diagrams of example computer-implemented methods for traffic aware smart caching in switch arrangements. The steps shown in FIGS. 5-7 can be performed by any suitable circuit, device, and/or computing system, including system 100 in FIG. 1, variations or combinations of systems discussed herein, or other suitable system. In some examples, one or more of the steps shown in FIGS. 5-7 can represent an algorithm whose structure includes and/or is represented by multiple sub-steps, examples of which will be provided in greater detail below.

FIG. 5 shows an example process 500 for traffic aware smart caching in a switch arrangement, such as a fabric switch (e.g., fabric interface 240 and/or network switch 410). Process 500 includes receiving data requests from a computing device (502). For example, fabric switch 410 (e.g., first network controller 440) can receive data requests from host 415. Process 500 proceeds with retrieving data from a memory device based on the data requests (504). For instance, fabric switch 410 can retrieve requested data from one or more of FAM nodes 420 and/or FAM nodes 430. In some examples, first network controller 440 can identify which memory device has the requested data, and accordingly forwards data requests (e.g., through modified crossbar 450) to second network controller 460 (for retrieving data from FAM nodes 420) and/or to third network controller 462 (for retrieving data from FAM nodes 430).

Process 500 continues with determining network statistics based on the data requests (506). For example, modified crossbar 450 (e.g., flit profiler 452 and/or pattern statistics analyzer 454) can determine and analyze network statistics from traffic crossing therethrough in response to the data requests, which can include evaluating each memory device individually. Process 500 further includes determining a cache policy based on network statistics (508). As described above, cache agent 456 can determine, for example, data placement decisions (e.g., selecting which memory device to store new data) which in some examples can relate to caching data requests, cache partitioning policies and/or cache eviction policies for the cache (e.g., an iteration of cache 235 for network switch 410). As described above, portions of the cache can be dedicated to caching frequently accessed data for a FAM device. In some examples, cache agent 456 can apply a global cache policy for data requests for all of FAM nodes 420 and FAM nodes 430. In some examples, cache agent 456 can apply specific cache policies to data requests of specific memory devices, such as applying similar cache policies to memory devices exhibiting similar network statistics, applying cache policies to redistribute traffic (e.g., for redirecting data requests from over-utilized memory devices to underutilized memory devices), etc.

Process 500 further continues with caching data based on the cache policy (510), for example, to reduce data latency for data requested by the computer device. In some implementations, cache agent 456 can enforce the cache policy, which can further interface with first network controller 440, second network controller 460, and/or third network controller 462 to apply and/or enforce the cache policy. The data or network statistics can include a data sparsity ratio determined as a number of accessed memory pages on a particular memory device as a percentage of the total number of pages allocated on the particular memory device. In some examples, the memory device can be a fabric-attached memory device. The method can be at least partially performed by the network switch. In some examples, the method can be a computer-implemented method for traffic aware smart caching in a network switch, where at least a portion of the method is performed by a computer device, a network switch, or any other device including at least one processor. The network switch can a component of a fabric network, and caching data can include caching data on a fabric-attached memory device.

FIG. 6 shows an example method 600 for traffic aware smart caching in a networked system, which can, in some examples, be performed at least in part by a cache agent (e.g., cache controller 234 and/or cache agent 456) within a network switch (e.g., fabric interface 240 and/or fabric switch 410). An example method 600 can include identifying a memory latency problem (602), for example, by determining if a queuing delay threshold is exceeded for requests from a particular memory device (e.g., one of FAM nodes 420 and/or FAM nodes 430). For instance, cache agent 456 can evaluate data parameters/statistics (e.g., as collected/processed by flit profiler 452 and/or pattern statistics analyzer 454) to identify the memory latency problem, which in some examples can correspond to a majority (e.g., $99^{th}$ percentile or other appropriate percentile) of queuing delay for the memory device exceeds the queuing delay threshold (e.g., 100 ns or other time value, which in some implementations can be configurable). If cache agent 456 identifies the memory latency problem (e.g., the queuing delay exceeds the queuing delay threshold), cache agent 456 can compare a sparsity ratio (discussed in more detail above) to a threshold sparsity ratio value (604). In some examples, the sparsity ratio of the memory device being less than the threshold sparsity ratio value (e.g., 10% or other appropriate threshold) can indicate that the memory device is accessed with some locality. Accordingly, if the sparsity ratio is less than the threshold sparsity ratio value, cache agent 456 can allocate a dedicated region of the switch cache to storage of data being requested from a particular memory device (606).

In some examples, as described above, the dedicated memory within the switch cache can be a fraction of the switch cache memory that is approximately equal to the percentage of the accesses going to the particular memory device, although in other examples other ratios can be used. An example method can optionally further include flushing the switch cache when the FAM (or portion thereof) is unmapped from computing device requestor(s).

FIG. 7 shows a further example method 700 for traffic aware smart caching in a switch arrangement. The example method includes receiving data requests from a computing device (702), for example network switch 410 (e.g., first network controller 440) receiving data requests from host 415. Network switch 410 (e.g., second network controller 460 and/or third network controller 462) can retrieve data based on the data requests (704), such as retrieving data from one or more of FAM nodes 420 and 430 based on the data requests. Network switch 410 (e.g., modified crossbar 450 and more specifically one or more of flit profiler 452, pattern statistics analyzer 454, and cache agent 456) can determine network statistics related to the data requests (706). Cache agent 456 can reconfigure at least one network-attached memory device based on the network statistics (708). For example, cache agent 456 can reconfigure a cache (e.g., cache 235) as described above, and further reconfigure new data placement decisions to mirror the cache reconfiguration. In some examples, the method can be performed by a network switch such as fabric interface 240 and/or network switch 410. In some examples, the network can be a fabric network (e.g., memory-semantic fabric 120) and the network-attached memory device can be a fabric-attached memory (e.g., memory 122B, FAM 220, memory 222A-222M, FAM nodes 340 and 342, and/or FAM nodes 420 and 430).

In some examples, methods steps can be performed by one or more of the systems described herein, such as the apparatus described above in relation to FIGS. 1 and 2. In some examples, an example method can be encoded as computer-readable instructions on a non-transitory computer-readable medium. For example, a computer-readable medium can include one or more computer-executable instructions that, when executed by at least one processor of a device, can cause the computer device to perform a method such as described herein. For example, a computer-readable medium can include one or more computer-executable instructions that, when executed by a controller (e.g., including at least one processor) of a device, can cause the device to receive data requests from a computer device, determine data statistics based on the data requests, determining a cache policy based on data statistic, and cache data based on the cache policy to reduce data latency for data requested by the computer device. The cache policy can include creation of a local cache for particular requests of a computer device.

In some examples, dynamic adaptation of cache memory allocation can be based on workload usage patterns. Dynamic adaptation of cache memory allocation can be performed by one or more processors associated with the network switch (if provided) and/or one or more processors associated with at least one computer device. In some examples, the network reconfiguration can be handled by any suitable hypervisor software. In some examples, a device can further include a controller that can include one or more processors.

A fabric switch agent with caching functionality can adjust the number of data packets arriving at each FAM, and can adaptively change in the traffic to each FAM component as the cache agent balances the load demand originating from one or more compute devices. Examples can also include apparatus and methods useful on any device that can be a component of a data fabric. Example data fabric configurations include CXL, xGMI, NVlink or any suitable configuration. Examples are not limited to any specific configuration.

In some examples, a system can include a network including a plurality of network switches, where at least one network switch of the plurality of network switches includes a first network controller configured to receive data requests, a second network controller configured to retrieve data based on the data requests, and a cache agent configured to receive data access parameters based on the data requests, and reconfigure connections to at least one memory cache based on the data access parameters.

In some examples, a system can further include a computer device and a plurality of memory devices, where the plurality of network switches is configured to connect the computer device to at least one memory device of the plurality of memory devices. The first network controller can be configured to receive data requests from the computer device, and the second network controller can be configured to retrieve data from at least one memory device of the plurality of memory devices. In some examples, the network switch can further include a third network controller attached to at least one of a second plurality of memory devices. The network can be a fabric network, and the plurality of memory devices can include a plurality of fabric-attached memory devices. In some examples, a device can include physical memory, and the at least one memory cache can include the physical memory. In some examples, the at least one memory cache can include a storage buffer located within the device. In some examples, the at least one memory cache can include at least one network-attached memory device, such as one or more fabric-attached memory device.

In some examples, a network switch can include a cross-bar circuit (or other circuit) including a cache agent, a flit profiler, and a pattern statistics analyzer. The flit profiler can be configured to receive data access requests from the computer device, determine the data access parameters based on the data access requests, and provide a data packet including the data access parameters to the cache agent. The flit profiler can be further configured to provide the data packet to the pattern statistics analyzer. The pattern statistics analyzer can be configured to provide data access statistics based on the data access parameters.

In some examples, the data access parameters can include a latency of at least one network-attached memory device of the plurality of network-attached memory devices and/or a data sparsity ratio determined as a number of accessed memory pages on a particular memory device as a percentage of the total number of pages allocated on the particular memory device.

In some examples, a system includes a fabric network including a plurality of fabric switches, a plurality of computer devices, and a plurality of fabric-attached memory devices, where the fabric network connects the plurality of computer devices to the plurality of fabric-attached memory devices, and at least one fabric switch of the plurality of fabric switches includes a cache agent. The cache agent can be configured to receive data access parameters based on data access requests received from the at least one computer device, and reconfigure connections between the at least one computer device to the plurality of network-attached memory devices based on the data access parameters. The data access parameters can include a data sparsity ratio determined as a number of accessed memory pages on a particular memory device as a percentage of the total number of pages allocated on the particular memory device. If the data sparsity is less than a threshold data sparsity, the cache agent can create a switch cache memory associated with (e.g., within or otherwise in communication with) the network switch to cache requested data.

Examples also include applications in server configurations, for example, server configurations configured to provide cloud services and/or to handle of big data. Examples include apparatus and methods that improve workload handing in data center server configurations and/or to provide performance improvements across disaggregated compute and memory resources.

Examples can include a network switching configurations such as a fabric memory that includes memory devices located at the switches that allow caching of frequently-accessed data. For example, memory devices can be a component of the switches, in communication with the switches and/or located proximate the switches. Fabric accessed memories (FAMs) can store the latest data and memory caches can be flushed at intervals and updated with the latest data from the FAMs. A modified switch (e.g., a crossbar switch) can include a flit profiler, a pattern analyzer and a caching agent. The flit profiler can receive data requests and send request-related data to the pattern analyzer and the caching agent. The caching agent can determine access statistics, for example, data access parameters such as data latency (e.g., data access delays) and data sparsity (which relates to a ratio of the number of accessed memory pages to the total number of pages on a FAM). Sequentially accessed data can a better candidate for caching than randomly accessed data, and can be prefetched to the cache. Local memory can be used to provide data that would otherwise be obtained from the FAM, reducing latency. In some examples, FAM nodes can be partitioned into memory caches for particular data and/or data can be stored in local switch buffers. Examples include switch configurations with cached memory at one or more switches (e.g., local buffers) and methods to determine which data to cache based on, for example, access request statistics (e.g., request frequency and/or latency).

In some examples, a system can include a network comprising a plurality of network switches, wherein at least one network switch includes a first network controller configured to receive data requests, a second network controller configured to retrieve data based on the data requests, and a cache agent. The cache agent can be configured to receive network statistics such as data access parameters based on the data requests, and reconfigure connections to at least one memory cache based on the data access parameters. The plurality of network switches can be components of a network, such as a fabric network, configured to connect the computer device to at least one memory device of the plurality of memory devices.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the instructions described herein can configure a computing system (e.g., a server) to facilitate multi-tenancy for one or more of the functions described herein. For example, one or more of the instructions described herein can program a server to enable two or more clients (e.g., customers) to share an application that is running on the server. A server programmed in this manner can share an application, operating system, processing system, and/or storage system among multiple customers (i.e., tenants). One or more of the instructions described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the instructions and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computer devices, including mobile phones, tablet computers, e-book readers, personal digital assistants, wearable computer devices (e.g., computer devices with a head-mounted display, smartwatches, etc.), variations or combinations of one or more of the same, or any other suitable mobile computer devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using circuits/processors with logic/instructions that perform certain tasks. These instructions can include script, batch, or other executable files that can be stored on a computer-readable storage medium or in a computing system. In some implementations, these instructions can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A fabric switch comprising:
    at least one first fabric interface to receive data requests from fabric and to retrieve requested data from at least one fabric-attached memory device in response to the data request;
    at least one second interface to communicate with the at least one fabric-attached memory device;
    a cache configured to cache data for the at least one fabric-attached memory device; and
    a cache controller configured to reconfigure a cache policy of the cache of the fabric switch based on the data requests for the at least one fabric-attached memory device.

2. The fabric switch of claim 1, wherein the at least one first fabric interface is configured to receive a data request, of the data requests, via the fabric from a computing device.

3. The fabric switch of claim 1, wherein the the cache controller is configured to reconfigure the cache policy of the cache of the fabric switch based on the data requests at least in part by reconfiguring the cache policy based on a latency of retrieving data from the at least one fabric-attached memory device in response to retrieve the data requests.

4. The fabric switch of claim 1, wherein the cache controller is configured to reconfigure the cache policy of the cache of the fabric switch using data access statistics based on the data requests.

5. The fabric switch of claim 1, wherein the the cache controller is configured to reconfigure the cache policy of the cache of the fabric switch based on the data requests at least in part by reconfiguring the cache policy based on a data sparsity ratio determined as a number of accessed memory pages on a fabric-attached memory device as a percentage of a total number of pages allocated on the fabric-attached memory device.

6. The fabric switch of claim 1, wherein:
the fabric switch comprises a crossbar switch; and
the crossbar switch comprises the cache controller.

7. The fabric switch of claim 1, wherein:
the at least one fabric-attached memory device is a plurality of fabric-attached memory devices; and
the cache controller is configured to reconfigure the cache policy at least in part by repartitioning the cache for holding data for two or more memory devices from among the plurality of fabric-attached memory devices, and wherein repartitioning the cache comprises setting a size of a partition corresponding to a first fabric-attached memory device of the plurality of fabric-attached memory devices based on a share of data requests for the first fabric-attached memory device out of data requests for the plurality of fabric-attached memory devices.

8. A system comprising:
a fabric; and
a fabric switch coupled to the fabric, the fabric switch comprising:
    a fabric-attached memory device;
    at least one fabric controller configured to receive a data request from a computing device via the fabric and to retrieve requested data from the fabric-attached memory device based on the data request;
    a cache configured to cache data requests for the fabric-attached memory device; and
    a cache controller configured to reconfigure a cache policy of the cache based on the data requests for the fabric-attached memory device.

9. The system of claim 8, wherein the the cache controller is configured to reconfigure the cache policy of the cache of the fabric switch based on the data requests at least in part by reconfiguring the cache policy based on a data sparsity ratio determined as a number of accessed memory pages on a particular memory device as a percentage of a total number of pages allocated on the particular memory device.

10. The system of claim 9, wherein the cache controller is configured to modify the cache policy based on the data sparsity ratio.

11. The system of claim 9, wherein the cache controller is configured to modify the cache policy to cache requested data if the data sparsity ratio is less than a threshold data sparsity ratio.

12. The system of claim 8, wherein:
the fabric switch further comprises at least one second fabric-attached memory device; and
the cache controller is configured to reconfigure the cache policy at least in part by repartitioning the cache for holding data for two or more memory devices from among the fabric-attached memory device and the at least one second fabric-attached memory device.

13. The system of claim 12, wherein repartitioning the cache comprises setting a size of a partition corresponding to a first fabric-attached memory device of the two or more memory devices based on a share of data requests for the first fabric-attached memory device out of data requests for the two or more memory devices.

14. The system of claim 13, wherein the cache controller manages the partition corresponding to the first fabric-attached memory device to exclusively cache data stored by the first fabric-attached memory device.

15. The system of claim 14, wherein the cache controller manages the partition according to a least recently used (LRU) eviction policy in connection with data stored by the first fabric-attached memory device.

16. A method, comprising:
receiving, by a network switch, data requests from a computing device;
determining data statistics based on the data requests;
determining a cache policy for a cache of the network switch based on data statistics; and
caching data in the cache based on the cache policy to reduce data latency for data requested by the computing device.

17. The method of claim 16, wherein:
the data statistics include a data sparsity ratio determined as a number of accessed memory pages on a memory device as a percentage of a total number of pages allocated on the memory device; and
the memory device is a fabric-attached memory device.

18. The method of claim 16, wherein the method is at least partially performed by the network switch.

19. The method of claim 16, wherein:
the network switch is a component of a fabric network; and
caching data comprises caching data for a fabric-attached memory device of the fabric network.

20. The method of claim 19, wherein the method is performed for each of a plurality of fabric-attached memory devices.

\* \* \* \* \*